(12) United States Patent
Tahara et al.

(10) Patent No.: US 9,850,999 B2
(45) Date of Patent: Dec. 26, 2017

(54) LUBRICATING STRUCTURE FOR VEHICLE DRIVE SYSTEM

(71) Applicants: Aisin Seiki Kabushiki Kaisha, Kariya-shi (JP); TOYOTA JIDOSHA KABUSHIKI KAISHA, Toyota-shi (JP)

(72) Inventors: Yasuaki Tahara, Nagoya (JP); Noriaki Nonaka, Chiryu (JP); Tsuyoshi Kimura, Toyota (JP); Masaya Michishita, Okazaki (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 72 days.

(21) Appl. No.: 14/979,397

(22) Filed: Dec. 27, 2015

(65) Prior Publication Data

US 2016/0186855 A1 Jun. 30, 2016

(30) Foreign Application Priority Data

Dec. 24, 2014 (JP) ................................. 2014-261187

(51) Int. Cl.
*F16H 57/04* (2010.01)
*F16H 57/00* (2012.01)
*B60K 1/00* (2006.01)

(52) U.S. Cl.
CPC ..... *F16H 57/0471* (2013.01); *F16H 57/0018* (2013.01); *F16H 57/045* (2013.01);
(Continued)

(58) Field of Classification Search
CPC ............. F16H 57/0409; F16H 57/0421; F16H 57/045; F16H 57/0457; F16H 57/048;
(Continued)

(56) References Cited

U.S. PATENT DOCUMENTS

| 2,049,234 A | * | 7/1936 | Thomas | F16H 57/0421 184/11.1 |
| 3,529,698 A | * | 9/1970 | Nelson | B61C 17/08 184/11.2 |

(Continued)

FOREIGN PATENT DOCUMENTS

| JP | 2004-68820 A | 3/2004 |
| JP | 2004-68850 A | 3/2004 |

(Continued)

*Primary Examiner* — Michael Riegelman
(74) *Attorney, Agent, or Firm* — Oblon, McClelland, Maier & Neustadt, L.L.P.

(57) ABSTRACT

A partition wall that partitions an inside of a case into a gear chamber in which a reduction gear pair is accommodated and a motor chamber in which an electric motor is accommodated, a bearing provided at a bearing support portion of the partition wall so as to overlap with a side portion of a large-diameter gear of the reduction gear pair in a direction of an axis and supporting a counter shaft, an oil passage provided in the gear chamber and guiding lubricating oil, scooped up by the large-diameter gear to a catch tank, and a communication hole provided in the partition wall and providing communication between the oil passage and the motor chamber, are provided. Lubricating oil introduced into the motor chamber via the communication hole is supplied to the bearing.

4 Claims, 3 Drawing Sheets

(52) U.S. Cl.
CPC ..... *F16H 57/0423* (2013.01); *F16H 57/0424* (2013.01); *F16H 57/0445* (2013.01); *B60K 1/00* (2013.01); *B60K 2001/001* (2013.01)

(58) Field of Classification Search
CPC ............. F16H 57/0424; F16H 57/0427; F16H 57/0471; F16H 57/0018; F16H 57/0423; F16H 57/0445; B60K 1/00; B60K 2001/001
See application file for complete search history.

(56) References Cited

U.S. PATENT DOCUMENTS

| | | | | |
|---|---|---|---|---|
| 4,470,324 A | * | 9/1984 | Renk | F16H 57/0423 277/409 |
| 4,648,485 A | * | 3/1987 | Kovaleski | F01D 25/18 184/13.1 |
| 5,768,954 A | * | 6/1998 | Grabherr | F16H 57/0447 184/11.1 |
| 5,821,653 A | * | 10/1998 | Kinto | B60K 1/00 310/58 |
| 6,864,607 B2 | * | 3/2005 | Hashimoto | B60K 1/00 180/65.1 |
| 7,421,921 B2 | * | 9/2008 | Kimura | F16H 57/043 184/1.5 |
| 8,746,405 B2 | * | 6/2014 | Perakes | F16H 57/0409 184/6.12 |
| 8,899,381 B2 | * | 12/2014 | Ebihara | B60K 7/0007 184/6.12 |
| 9,103,432 B2 | * | 8/2015 | Isomura | F16H 57/0423 |
| 2004/0154846 A1 | * | 8/2004 | Kira | B60K 6/405 180/65.6 |
| 2008/0041179 A1 | * | 2/2008 | Yasui | F16H 57/027 74/467 |
| 2008/0308354 A1 | * | 12/2008 | Gratzer | B60K 17/344 184/6.12 |
| 2009/0165587 A1 | * | 7/2009 | Ariga | F16H 57/0423 74/467 |
| 2010/0050800 A1 | * | 3/2010 | Michishita | B60K 6/36 74/421 A |
| 2010/0180721 A1 | * | 7/2010 | Quehenberger | F16H 57/0419 74/606 R |
| 2011/0041649 A1 | * | 2/2011 | Iwata | F16H 57/0447 74/606 R |
| 2011/0192245 A1 | * | 8/2011 | Shioiri | F16H 57/0423 74/467 |
| 2011/0245010 A1 | * | 10/2011 | Nobata | F16H 57/0457 475/160 |
| 2012/0096968 A1 | * | 4/2012 | Kawamoto | F16H 57/0409 74/467 |
| 2013/0145879 A1 | * | 6/2013 | Nakamura | F16H 57/042 74/467 |
| 2015/0152954 A1 | * | 6/2015 | Kajikawa | F16H 57/045 475/150 |
| 2016/0123454 A1 | * | 5/2016 | Tahara | F16H 57/0409 74/467 |
| 2016/0123455 A1 | * | 5/2016 | Mikami | F16H 57/0424 74/467 |
| 2016/0153546 A1 | * | 6/2016 | Ogawa | F16H 57/0457 475/152 |
| 2016/0186854 A1 | * | 6/2016 | Tahara | F16H 57/0424 74/468 |
| 2016/0186855 A1 | * | 6/2016 | Tahara | F16H 57/0471 74/413 |
| 2017/0102064 A1 | * | 4/2017 | Preston | F16H 57/0457 |

FOREIGN PATENT DOCUMENTS

| | | | | |
|---|---|---|---|---|
| JP | 2006307908 A | * | 11/2006 | ......... F16H 57/0447 |
| JP | 2010-223376 | | 10/2010 | |
| JP | 2011-169430 | | 9/2011 | |
| JP | 2012189176 A | * | 10/2012 | |
| JP | 2014-101959 | | 6/2014 | |

* cited by examiner

LUBRICATING STRUCTURE FOR VEHICLE DRIVE SYSTEM

INCORPORATION BY REFERENCE

The disclosure of Japanese Patent Application No. 2014-261187 filed on Dec. 24, 2014 including the specification, drawings and abstract is incorporated herein by reference in its entirety.

BACKGROUND OF THE INVENTION

1. Field of the Invention

The invention relates to a lubricating structure for a vehicle drive system and, more particularly, to a lubricating structure for a dual-axis vehicle drive system, which reduces the stirring resistance of a reduction gear during traveling of a vehicle by driving a drive output shaft to rotate by the use of torque transmitted via the reduction gear from an electric motor, scooping up lubricating oil, which is stored at a bottom in a case of the vehicle drive system and supplied to a lubricated portion, with the reduction gear and storing part of the lubricating oil in a catch tank.

2. Description of Related Art

There is known a lubricating structure for a dual-axis vehicle drive system (see, for example, Japanese Patent Application Publication No. 2010-223376 (JP 2010-223376 A)). The lubricating structure includes a reduction gear pair inside a case of the vehicle drive system. The reduction gear pair is provided between an output shaft of an electric motor and a counter shaft parallel to the output shaft. The lubricating structure reduces the stirring resistance of a reduction gear during traveling of a vehicle by scooping up lubricating oil, which is stored at a bottom in the case and supplied to a lubricated portion, with the reduction gear pair and storing part of the lubricating oil in a catch tank.

SUMMARY OF THE INVENTION

However, in the above-described dual-axis vehicle drive system, when a partition wall that partitions the inside of the case into a gear chamber in which the reduction gear pair is accommodated and a motor chamber in which an electric motor is accommodated is provided in order to improve the effect of scooping up lubricating oil with the reduction gear pair and a bearing supporting the counter shaft is provided on the partition wall so as to overlap with a side portion of a large-diameter gear of the reduction gear pair in order to reduce the axial size of the counter shaft, this structure is difficult to cause lubricating oil to reach the bearing, supporting the counter shaft, by scooping up the lubricating oil by the use of the rotation of the reduction gear pair. Therefore, it is difficult to lubricate the bearing supporting the counter shaft.

The invention provides a lubricating structure for a vehicle drive system, which is able to lubricate a bearing, supporting a counter shaft, by scooping up lubricating oil with a reduction gear pair.

An aspect of the invention provides a lubricating structure for a vehicle drive system. The lubricating structure includes: a case; an electric motor arranged inside the case; a counter shaft rotatably coupled to a drive output shaft of the vehicle drive system, the counter shaft being supported inside the case so as to be parallel to an output shaft of the electric motor; a reduction gear pair provided between the output shaft of the electric motor and the counter shaft; a catch tank that stores part of lubricating oil, which is stored at a bottom in the case and supplied to a lubricated portion, as a result of scooping up the lubricating oil with the reduction gear pair; a partition wall that partitions an inside of the case into a gear chamber and a motor chamber, the reduction gear pair being accommodated in the gear chamber, the electric motor being accommodated in the motor chamber; a bearing provided at a bearing support portion of the partition wall so as to overlap with a side portion of a large-diameter gear of the reduction gear pair in an axial direction, the bearing supporting the counter shaft; an oil passage provided in the gear chamber, the oil passage guiding lubricating oil, scooped up by the large-diameter gear, to the catch tank; and a communication hole provided in the partition wall, the communication hole providing communication between the oil passage and the motor chamber. Lubricating oil introduced into the motor chamber via the communication hole is supplied to the bearing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
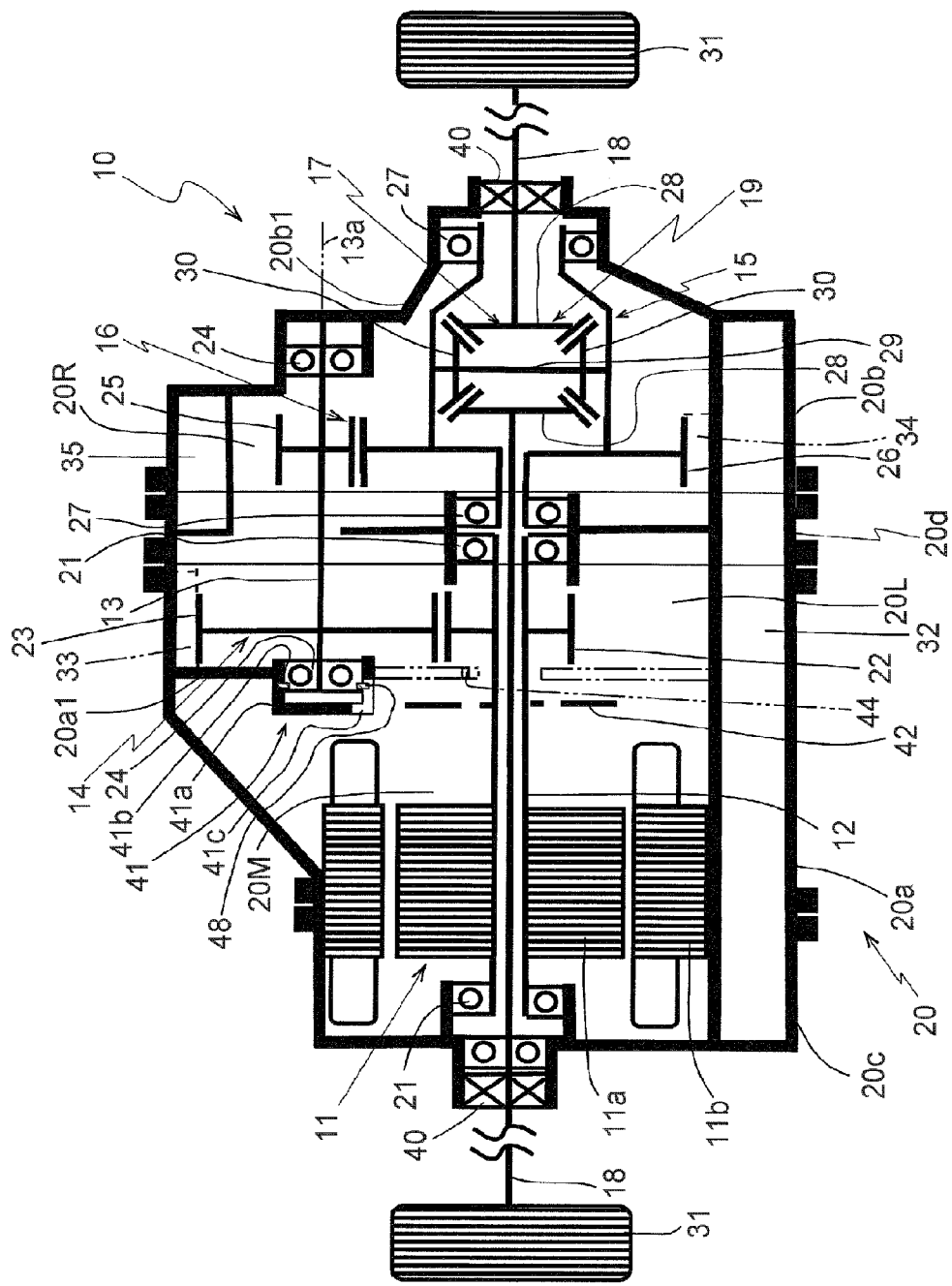
FIG. 1 is a skeletal view that illustrates the schematic configuration of a transaxle of a vehicle to which the invention is applied.

An embodiment of the invention will be described in detail with reference to the accompanying drawings. Like reference numerals denote the same or corresponding members in the drawings referenced below.

FIG. 1 is a skeletal view that shows the configuration of a rear transaxle 10, which is a vehicle drive system to which the lubricating structure for a vehicle drive system according to the invention is applied, in an electric four-wheel-drive vehicle. The rear transaxle 10 is a dual-axis electric vehicle drive system. The rear transaxle 10 includes an electric motor 11 as a drive source, a first reduction gear pair 14 (which is an example of a reduction gear pair), a second reduction gear pair 16 and a differential gear unit 19 inside a transaxle case 20. The first reduction gear pair 14 is provided between an output shaft 12 of the electric motor 11 and a counter shaft 13 parallel to the output shaft 12. The second reduction gear pair 16 is provided between the counter shaft 13 and a differential case 15 parallel to the counter shaft 13 and concentric with the electric motor 11. The differential gear unit 19 includes a differential mechanism 17 provided inside the differential case 15. The differential gear unit 19 drives a pair of rear wheel-side drive axles 18 (each of which is an example of a drive output shaft) to rotate by the use of torque transmitted from the electric motor 11 via the first reduction gear pair 14 and the second reduction gear pair 16.

A rotor 11a of the electric motor 11 is coupled to the center portion of the output shaft 12. A pair of bearings 21 are fitted to both ends of the output shaft 12. Thus, the output shaft 12 is rotatably supported by the transaxle case 20 via the pair of bearings 21. A stator coil unit 11*b* is provided around the rotor 11*a*, and is fixed to the transaxle case 20.

The first reduction gear pair 14 consists of a small-diameter counter drive gear 22 and a large-diameter counter driven gear 23 (which is an example of a large-diameter gear). The counter drive gear 22 is integrally fixed to the distal end side of one end of the output shaft 12. The counter driven gear 23 is integrally fixed to one end side of the counter shaft 13 in a state where the counter driven gear 23 is in mesh with the counter drive gear 22. A pair of bearings 24 are respectively fitted to both ends of the counter shaft 13. The counter shaft 13 is rotatably supported by the transaxle case 20 via the pair of bearings 24 (each of which is an example of a bearing that supports a counter shaft).

The second reduction gear pair 16 is arranged so as to be displaced in the axial direction with respect to the first reduction gear pair 14. The second reduction gear pair 16 consists of a small-diameter final drive gear 25 and a large-diameter final driven gear 26. The final drive gear 25 is integrally fixed to the other end of the counter shaft 13. The final driven gear 26 is arranged so as to be displaced from the counter drive gear 22 in the axial direction of the output shaft 12. The final driven gear 26 is fitted to the outer peripheral portion of the differential case 15 and integrally fixed in a state where the final driven gear 26 is in mesh with the final drive gear 25.

A pair of bearings 27 are respectively fitted to the outer peripheries of both axial ends of the differential case 15. Therefore, the differential case 15 and the final driven gear 26 integrally fixed to the differential case 15 are rotatably supported by the transaxle case 20 via these pair of bearings 27.

The differential mechanism 17 is of a generally known so-called bevel gear type. The differential mechanism 17 includes a pair of side gears 28 and a pair of pinion gears 30. The pair of side gears 28 are opposed to each other along the rotation axis inside the differential case 15. The pair of pinion gears 30 are rotatably supported by a pinion shaft 29 between these pair of side gears 28, and each are in mesh with the pair of side gears 28. The pinion shaft 29 is fixed to the differential case 15 in a state where the pinion shaft 29 is perpendicular to the rotation axis of the differential case 15.

The pair of drive axles 18 are respectively integrally coupled to the pair of side gears 28. The differential gear unit 19 that includes the differential case 15 and the differential mechanism 17 drives the pair of drive axles 18 to rotate by the use of torque transmitted from the electric motor 11 via the first reduction gear pair 14 and the second reduction gear pair 16 while allowing a rotation speed difference between the pair of drive axles 18. One of the pair of drive axles 18 is inserted through the hollow cylindrical output shaft 12 and is coupled to a vehicle left-side one of a pair of rear wheels 31. A pair of seal members 40 (shown in FIG. 1) are respectively provided between one of the pair of drive axles 18 and the transaxle case 20 and between the other one of the pair of drive axles 18 and the transaxle case 20.

As shown in FIG. 1, the transaxle case 20 is formed of four split portions in the axial direction of the drive axles 18. A partition member 20*d* is a component of the transaxle case 20. The partition member 20*d* has a cylindrical shape. The partition member 20*d* partitions the inside of the transaxle case 20 into a first gear chamber 20L (which is an example of a gear chamber) and a second gear chamber 20R. The first reduction gear pair 14 is accommodated in the first gear chamber 20L. The second reduction gear pair 16 is accommodated in the second gear chamber 20R. The transaxle case 20 further includes a cylindrical first split case portion 20*a*, a lid-shaped second split case portion 20*b* and a lid-shaped third split case portion 20*c*. The first split case portion 20*a* is fixed to one side (left side in FIG. 1) of the partition member 20*d*. The first split case portion 20*a* includes a side wall 20*a*1 (which is an example of a partition wall) that defines the first gear chamber 20L in cooperation with the partition member 20*d*. The second split case portion 20*b* is fixed to the other side (right side in FIG. 1) of the partition member 20*d*. The second split case portion 20*b* includes a side wall 20*b*1 that defines the second gear chamber 20R in cooperation with the partition member 20*d*. The third split case portion 20*c* mainly accommodate the electric motor 11. The first split case portion 20*a*, the second split case portion 20*b*, the third split case portion 20*c* and the partition member 20*d* are components of the transaxle case 20, and are fastened to one another by bolts (not shown) in an oil-tight manner as shown in FIG. 1. These split case portions 20*a*, 20*b*, 20*c* and partition member 20*d* are made of a cast light alloy, for example, by aluminum die-casting, or the like.

As shown in FIG. 1, the side wall 20*a*1 of the first split case portion 20*a* partitions the inside of the first split case portion 20*a* such that one side of the first split case portion 20*a* is the first gear chamber 20L and the other side of the first split case portion 20*a* is a motor chamber 20M in which the electric motor 11 is accommodated. Thus, it is possible to improve the effect of scooping up lubricating oil with the first reduction gear pair 14. As shown in FIG. 1, one of the pair of bearings 24 (which is an example of a bearing supporting the counter shaft 13) is provided at a bearing support portion 41 of the side wall 20*a*1 of the first split case portion 20*a* so as to overlap with a side portion of the counter driven gear 23 in the direction of an axis 13*a* of the counter shaft 13. Thus, it is possible to reduce the length of the counter shaft 13 in the direction of the axis 13*a*. One of the above-described pair of bearings 21 and one of the above-described pair of bearings 27 are supported by the partition member 20*d*. A resolver 42 is provided in the motor chamber 20M. The resolver 42 detects the rotation of the electric motor 11. The resolver 42 includes a connector portion 42*a* (see FIG. 2) at its radially outer side. The connector portion 42*a* is connected to an external circuit (not shown).

The counter driven gear 23 and the final driven gear 26 are configured to rotate to supply lubricating oil to lubricated portions by scooping up lubricating oil stored at the bottom in the transaxle case 20. That is, scoop-up lubrication is employed in the rear transaxle 10 according to the present embodiment. The scoop-up lubrication is to supply lubricating oil to the lubricated portions by scooping up lubricating oil that is stored at the bottom inside the transaxle case 20. The lubricated portions are, for example, meshing portions of the first reduction gear pair 14 and second reduction gear pair 16, gear meshing portions and rotational sliding portions of the differential mechanism 17, the bearings 21, 27, one of the pair of bearings 24, supported by the second split case portion 20*b*, and the like.

The transaxle case 20 includes a first catch tank 32 (which is an example of a catch tank) for storing part of scooped-up lubricating oil in order to lower the oil level position of lubricating oil that is stored at the bottom inside the transaxle case 20 for the purpose of reducing the stirring resistance of lubricating oil against the counter driven gear 23, which increases with an increase in vehicle speed V. A first oil passage 33 (which is an example of an oil passage) is provided inside the first split case portion 20*a* of the transaxle case 20. The first oil passage 33 guides lubricating oil, which is scooped up by the counter driven gear 23 of the first reduction gear pair 14, to the first catch tank 32 as indicated by the arrow A in FIG. 2. The first oil passage 33 has an opening end 33*a* from which lubricating oil scooped up by the rotation of the counter driven gear 23 enters.

Lubricating oil stored in the first catch tank 32 is supplied from a lubricating oil supply port (not shown) provided in the first catch tank 32 to a lubricated portion, overflows from the first catch tank 32 as a result of accumulation of lubricating oil at or above a predetermined amount or is supplied as naturally drained oil from a drain port (not shown), provided at the bottom of the first catch tank 32, to lubrication required portions, such as bearings and oil seals that are not immersed in lubricating oil as a result of a decrease in the oil level position at the bottom in the transaxle case 20. Thus, lubricating oil is returned to the bottom inside the transaxle case 20.

On the other hand, as shown in FIG. 1, a second oil passage 34 is provided inside the second split case portion 20*b* of the transaxle case 20. The second oil passage 34 guides lubricating oil, which is scooped up by the final driven gear 26 of the second reduction gear pair 16, to a second catch tank 35. The second catch tank 35, as well as the first catch tank 32, is provided in order to store scooped-up lubricating oil and lower the oil level position of lubricating oil that is stored at the bottom inside the transaxle case 20. Lubricating oil guided to the second catch tank 35 naturally drains from a drain hole (not shown), and is returned to the bottom inside the transaxle case 20.

Next, the structure of lubricating the above-described bearing 24 that supports the counter shaft 13, that is, the bearing 24 provided at the bearing support portion 41 of the side wall 20*a*1 of the first split case portion 20*a* so as to overlap with the side portion of the counter driven gear 23 in the direction of the axis 13*a*, will be described with reference to FIG. 1 to FIG. 3.

Figure 2:
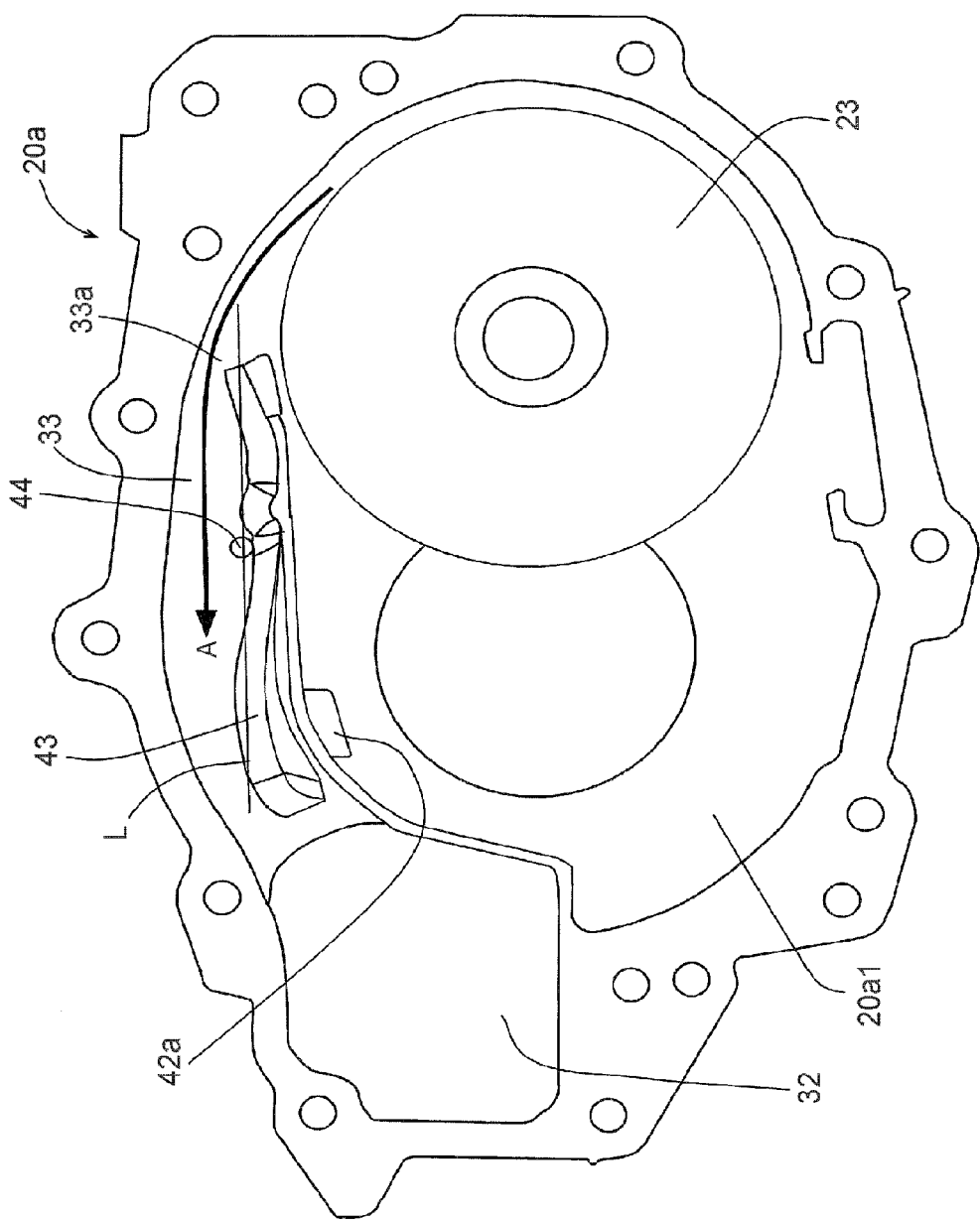
FIG. 2 is a front view that shows a side of a first split case portion of a transaxle case according to an embodiment of the invention, which is a mating face with a partition member.

As shown in FIG. 2, the first oil passage 33 is provided by utilizing the outer periphery of a circular-arc swelled portion 43 provided in order to arrange the connector portion 42*a* of the resolver 42 on the radially inner side of the swelled portion 43. A communication hole 44 is provided on the opening end 33*a* side of the first oil passage 33 with respect to the swelled portion 43 along a tangent L at the swelled portion 43 in the first oil passage 33. The communication hole 44 is provided in the side wall 20*a*1 of the first split case portion 20*a*, and provides communication between the mutually partitioned first gear chamber 20L and motor chamber 20M with each other. That is, the first oil passage 33 communicates with the motor chamber 20M via the communication hole 44. The opening end 33*a* side of the first oil passage 33 with respect to the swelled portion 43 along the tangent L of the swelled portion 43 in the first oil passage 33 is the position at which the communication hole 44 is provided, and is a position at which lubricating oil scooped up to the first oil passage 33 tends to accumulate because of the swelled portion 43. Therefore, it is possible to reliably introduce lubricating oil from the first oil passage 33 to the motor chamber 20M with the use of the communication hole 44.

Figure 3:
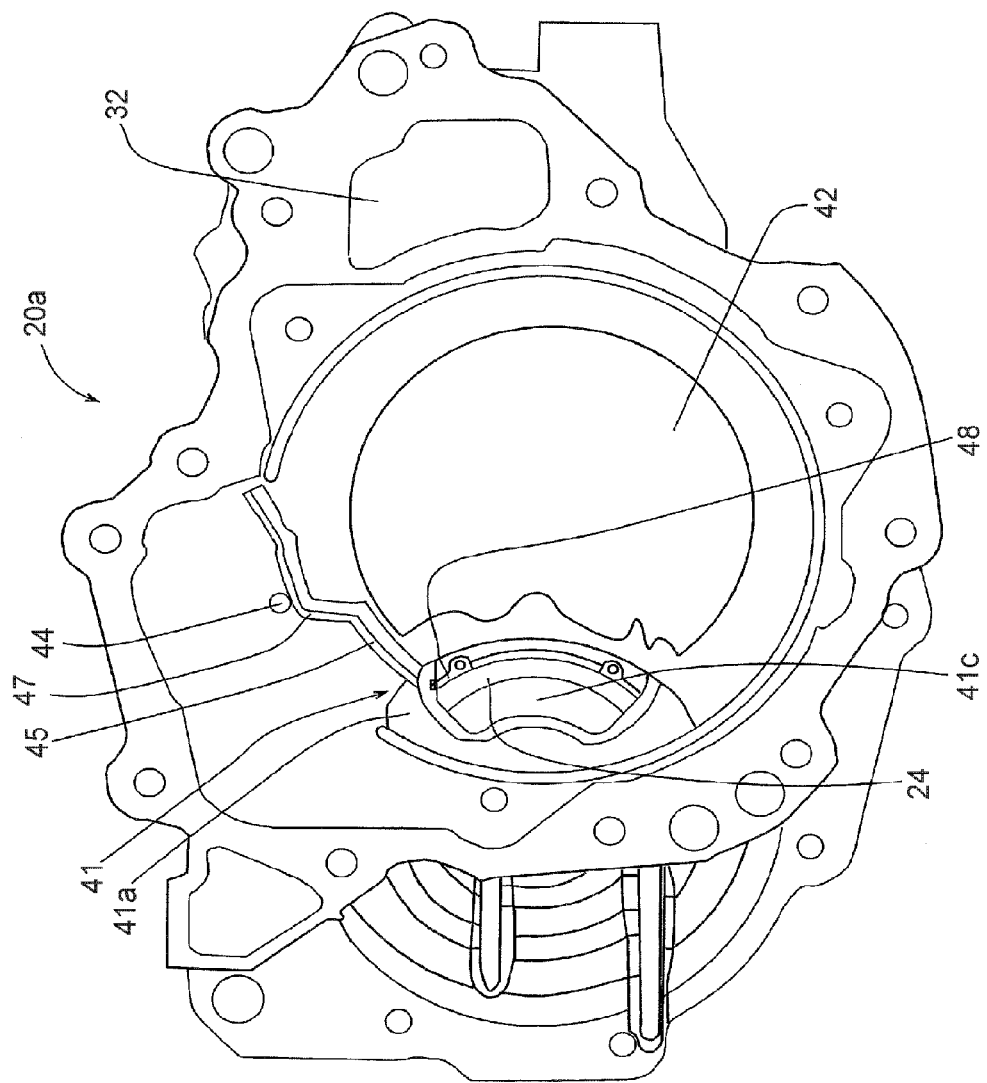
FIG. 3 is a front view that shows a side of the first split case portion of the transaxle case according to the embodiment of the invention, which is a mating face with a third split case portion.

As shown in FIG. 3, a faucet portion boss 45 (which is an example of a projected portion) that centers the resolver 42 is provided on the motor chamber 20M side of the side wall 20*a*1 of the first split case portion 20*a* and located on the radially outer side of the resolver 42. The bearing support portion 41 provided in the side wall 20*a*1 of the first split case portion 20*a* includes a protruding portion 41*a* (see FIG. 1 and FIG. 3), a closed-end bearing hole 41*b* (see FIG. 1) and a snap ring assembling cutout 41*c* (see FIG. 1 and FIG. 3). The protruding portion 41*a* protrudes into the motor chamber 20M side. The bearing hole 41*b* is open to the first gear chamber 20L, and fits and supports the bearing 24. The snap ring assembling cutout 41*c* is provided at the protruding portion 41*a* so as to open to the motor chamber 20M in order to constrict a snap ring 48 (see FIG. 1 and FIG. 3) for fixing the bearing 24 in the bearing hole 41*b*.

As shown in FIG. 3, the snap ring assembling cutout 41*c* is a circular arc cutout provided in the protruding portion 41*a*. The snap ring assembling cutout 41*c* is provided in order to allow snap ring pliers (not shown) that are an assembling tool to enter the protruding portion 41*a* for the purpose of assembling the snap ring 48 into both an assembling groove of the protruding portion 41*a* of the bearing support portion 41 and an assembling groove of the bearing 24. The snap ring 48 restricts movement of the bearing 24, which is supported by the bearing support portion 41, in the direction of the axis 13*a* with respect to the bearing support portion 41.

The snap ring pliers are put into the protruding portion 41*a* via the snap ring assembling cutout 41*c*. The snap ring 48 fitted to the bearing 24 is constricted by the snap ring pliers. The position of the bearing 24 and the position of the bearing support portion 41 are aligned in the direction of the axis 13*a*. After completion of the position alignment, the snap ring pliers are released from the snap ring 48. As a result, the snap ring 48 expands to fit into the above-described assembling grooves of the bearing support portion 41 and bearing 24. Thus, assembling of the bearing 24 to the bearing support portion 41 completes.

As shown in FIG. 3, lubricating oil introduced into the motor chamber 20M via the communication hole 44 flows on the outer periphery of the faucet portion boss 45, reaches the snap ring assembling cutout 41*c*, enters the protruding portion 41*a* via the snap ring assembling cutout 41*c*, and is then supplied to the bearing 24 supported by the bearing support portion 41. Lubricating oil introduced via the communication hole 44 flows on the outer periphery of the bearing 24, and accumulates at the bottom in the bearing support portion 41, so the bearing 24 is immersed in lubricating oil to be lubricated. As shown in FIG. 3, guidance of lubricating oil from the communication hole 44 to the faucet portion boss 45 is performed by an oil guidance rib 47 extending from the side wall 20*a*1 of the first split case portion 20*a*.

As described above, the lubricating structure for a vehicle drive system according to the present embodiment includes the electric motor 11, the counter shaft 13, the first reduction gear pair 14 (which is an example of a reduction gear pair), the first catch tank 32 (which is an example of a catch tank), the side wall 20*a*1 (which is an example of a partition wall), the bearing 24, the first oil passage 33 (which is an example of an oil passage) and the communication hole 44. The electric motor 11 is arranged inside the transaxle case 20 (which is an example of a case) of the rear transaxle 10 (which is an example of a vehicle drive system). The counter shaft 13 is rotatably coupled to the drive axles 18 (each of which is an example of a drive output shaft) of the rear transaxle 10, and is supported inside the transaxle case 20 so as to be parallel to the output shaft 12 of the electric motor 11. The first reduction gear pair 14 is provided between the output shaft 12 of the electric motor 11 and the counter shaft 13. Lubricating oil that is stored at the bottom in the transaxle case 20 and supplied to the lubricated portion is scooped up by the first reduction gear pair 14. The first catch tank 32 stores part of the lubricating oil. The side wall 20a1 partitions the inside of the transaxle case 20 into the first gear chamber 20L (which is an example of a gear chamber) that accommodates the first reduction gear pair 14 and the motor chamber 20M in which the electric motor 11 is accommodated. The bearing 24 is provided at the bearing support portion 41 of the side wall 20a1 so as to overlap with the side portion of the counter driven gear 23 (which is an example of a large-diameter gear) of the first reduction gear pair 14 in the direction of the axis 13a. The bearing 24 supports the counter shaft 13. The first oil passage 33 (which is an example of an oil passage) is provided in the first gear chamber 20L, and guides lubricating oil, scooped up by the counter driven gear 23, to the first catch tank 32. The communication hole 44 is provided in the side wall 20a1, and provides communication between the first oil passage 33 and the motor chamber 20M. Lubricating oil introduced into the motor chamber 20M via the communication hole 44 is supplied to the bearing 24. Thus, the communication hole 44 that provides communication between the first oil passage 33 and the motor chamber 20M is provided in the side wall 20a1, and lubricating oil introduced into the motor chamber 20M via the communication hole 44 is supplied to the bearing 24. Therefore, it is possible to introduce lubricating oil, scooped up by the counter driven gear 23, from the first gear chamber 20L to the motor chamber 20M via the communication hole 44, so it is possible to lubricate the bearing 24 with the use of lubricating oil introduced into the motor chamber 20M.

As described above, with the lubricating structure for a vehicle drive system according to the present embodiment, the first oil passage 33 has the opening end 33a from which lubricating oil scooped up by the rotation of the counter driven gear 23 enters, the resolver 42 that detects the rotation of the electric motor 11 is provided in the motor chamber 20M, the first oil passage 33 has the swelled portion 43 for arranging the resolver 42 on the radially inner side, and the communication hole 44 is provided at the opening end 33a side of the first oil passage 33 with respect to the swelled portion 43. Thus, the communication hole 44 is provided at a position at which scooped-up lubricating oil tends to accumulate in the first oil passage 33, so it is possible to reliably introduce lubricating oil into the motor chamber 20M via the communication hole 44.

As described above, with the lubricating structure for a vehicle drive system according to the present embodiment, the faucet portion boss 45 (which is an example of a projected portion) is located on the radially outer side of the resolver 42 and is provided on the motor chamber 20M side in the side wall 20a1, the bearing support portion 41 includes the protruding portion 41a, the closed-end bearing hole 41b and the snap ring assembling cutout 41c, the protruding portion 41a protrudes into the motor chamber 20M, the closed-end bearing hole 41b is open to the first gear chamber 20L and fits and supports the bearing 24, the snap ring assembling cutout 41c is provided in the protruding portion 41a so as to open to the motor chamber 20M in order to constrict the snap ring 48 for fixing the bearing 24 in the bearing hole 41b, and lubricating oil introduced into the motor chamber 20M via the communication hole 44 flows on the outer periphery of the faucet portion boss 45 and is supplied to the bearing 24 via the snap ring assembling cutout 41c. Thus, the faucet portion boss 45 that is used to center the resolver 42 is allowed be utilized as the projected portion, and it is possible to supply lubricating oil, introduced into the motor chamber 20M via the communication hole 44, to the bearing 24 by utilizing the snap ring assembling cutout 41c that is required to attach the bearing 24 to the bearing support portion 41, so it is not required to provide an additional component.

As described above, with the lubricating structure for a vehicle drive system according to the present embodiment, the oil guidance rib 47 that guides lubricating oil from the communication hole 44 to the faucet portion boss 45 is provided on the side wall 20a1. Thus, guidance of lubricating oil from the communication hole 44 to the faucet portion boss 45 is reliable.

When there are a plurality of embodiments, unless otherwise specified, it is clear that characterized portions of the respective embodiments are allowed to be combined with each other as needed.

What is claimed is:

1. A lubricating structure for a vehicle drive system, the lubricating structure characterized by comprising:
    a case;
    an electric motor arranged inside the case;
    a counter shaft rotatably coupled to a drive output shaft of the vehicle drive system, the counter shaft being supported inside the case so as to be parallel to an output shaft of the electric motor;
    a reduction gear pair provided between the output shaft of the electric motor and the counter shaft;
    a catch tank that stores part of lubricating oil, which is stored at a bottom in the case and supplied to a lubricated portion, as a result of scooping up the lubricating oil with the reduction gear pair;
    a partition wall that partitions an inside of the case into a gear chamber and a motor chamber, the reduction gear pair being accommodated in the gear chamber, the electric motor being accommodated in the motor chamber, the partition wall located between the gear chamber and the motor chamber;
    a bearing provided at a bearing support portion of the partition wall so as to overlap with a side portion of a large-diameter gear of the reduction gear pair in an axial direction, the bearing supporting the counter shaft;
    an oil passage provided in the gear chamber, the oil passage guiding lubricating oil, scooped up by the large-diameter gear, to the catch tank; and
    a communication hole provided in the partition wall, the communication hole providing communication between the oil passage and the motor chamber, wherein
    lubricating oil introduced from the gear chamber into the motor chamber via the communication hole is supplied to the bearing.

2. A lubricating structure for a vehicle drive system, the lubricating structure characterized by comprising:
    a case;
    an electric motor arranged inside the case;
    a counter shaft rotatably coupled to a drive output shaft of the vehicle drive system, the counter shaft being supported inside the case so as to be parallel to an output shaft of the electric motor;
    a reduction gear pair provided between the output shaft of the electric motor and the counter shaft;
    a catch tank that stores part of lubricating oil, which is stored at a bottom in the case and supplied to a lubricated portion, as a result of scooping up the lubricating oil with the reduction gear pair;
    a partition wall that partitions an inside of the case into a gear chamber and a motor chamber, the reduction gear pair being accommodated in the gear chamber, the electric motor being accommodated in the motor chamber;

a bearing provided at a bearing support portion of the partition wall so as to overlap with a side portion of a large-diameter gear of the reduction gear pair in an axial direction, the bearing supporting the counter shaft;

an oil passage provided in the gear chamber, the oil passage guiding lubricating oil, scooped up by the large-diameter gear, to the catch tank; and a communication hole provided in the partition wall, the communication hole providing communication between the oil passage and the motor chamber, wherein lubricating oil introduced into the motor chamber via the communication hole is supplied to the bearing, the oil passage has an opening end from which lubricating oil scooped up by rotation of the large-diameter gear enters, a resolver that detects rotation of the electric motor is provided in the motor chamber, the oil passage has a swelled portion for arranging the resolver on a radially inner side of the swelled portion, and the communication hole is provided on the opening end side of the oil passage with respect to the swelled portion.

3. A lubricating structure for a vehicle drive system, the lubricating structure characterized by comprising:

a case;

an electric motor arranged inside the case;

a counter shaft rotatably coupled to a drive output shaft of the vehicle drive system, the counter shaft being supported inside the case so as to be parallel to an output shaft of the electric motor;

a reduction gear pair provided between the output shaft of the electric motor and the counter shaft;

a catch tank that stores part of lubricating oil, which is stored at a bottom in the case and supplied to a lubricated portion, as a result of scooping up the lubricating oil with the reduction gear pair;

a partition wall that partitions an inside of the case into a gear chamber and a motor chamber, the reduction gear pair being accommodated in the gear chamber, the electric motor being accommodated in the motor chamber;

a bearing provided at a bearing support portion of the partition wall so as to overlap with a side portion of a large-diameter gear of the reduction gear pair in an axial direction, the bearing supporting the counter shaft;

an oil passage provided in the gear chamber, the oil passage guiding lubricating oil, scooped up by the large-diameter gear, to the catch tank; and a communication hole provided in the partition wall, the communication hole providing communication between the oil passage and the motor chamber, wherein lubricating oil introduced into the motor chamber via the communication hole is supplied to the bearing, a projected portion is located on a radially outer side of a resolver, and is provided on the motor chamber side in the partition wall, the bearing support portion includes a protruding portion, a closed-end bearing hole and a snap ring assembling cutout, the protruding portion protrudes into the motor chamber, the closed-end bearing hole is open to the gear chamber, and fits and supports the bearing, the snap ring assembling cutout is provided in the protruding portion so as to open to the motor chamber in order to constrict a snap ring for fixing the bearing in the closed-end bearing hole, and lubricating oil introduced into the motor chamber via the communication hole flows on an outer periphery of the projected portion and is supplied to the bearing via the snap ring assembling cutout.

4. The lubricating structure according to claim 3, wherein an oil guidance rib that guides the lubricating oil from the communication hole to the projected portion is provided on the partition wall.

* * * * *